(12) United States Patent
Faler et al.

(10) Patent No.: US 7,635,727 B2
(45) Date of Patent: Dec. 22, 2009

(54) COMPOSITE TRANSPARENCIES

(75) Inventors: Dennis L. Faler, Glenshaw, PA (US); Cheryl E. Belli, New Kensington, PA (US); Stephen G. McQuown, Cheswick, PA (US); John A. Winter, Pittsburgh, PA (US); Deborah E. Hayes, Verona, PA (US); James P. Colton, Trafford, PA (US); Shan Cheng, Pittsburgh, PA (US); Noel R. Vanier, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 636 days.

(21) Appl. No.: 11/399,144

(22) Filed: Apr. 6, 2006

(65) Prior Publication Data

US 2006/0247372 A1 Nov. 2, 2006

Related U.S. Application Data

(63) Continuation-in-part of application No. 11/337,062, filed on Jan. 20, 2006, which is a continuation-in-part of application No. 10/876,031, filed on Jun. 24, 2004.

(60) Provisional application No. 60/482,167, filed on Jun. 24, 2003.

(51) Int. Cl.
*C09D 11/00* (2006.01)

(52) U.S. Cl. .................. 523/160; 523/161; 524/847

(58) Field of Classification Search ................ 523/160, 523/161; 524/847
See application file for complete search history.

(56) References Cited

U.S. PATENT DOCUMENTS

| | | | |
|---|---|---|---|
| 3,389,061 A | 6/1968 | Bono | 204/32 |
| 4,499,143 A | 2/1985 | Panush | 428/336 |
| 4,960,638 A * | 10/1990 | Mukoyoshi et al. | 428/32.13 |
| 5,106,533 A | 4/1992 | Hendrickson et al. | 252/314 |
| 5,110,881 A | 5/1992 | McBain et al. | 525/455 |
| 5,201,948 A | 4/1993 | Fasano et al. | 106/311 |
| 5,334,297 A | 8/1994 | Nakada et al. | 204/181.2 |
| 5,340,789 A | 8/1994 | Evans et al. | 503/227 |
| 5,538,548 A | 7/1996 | Yamazaki | 106/20 C |
| 5,538,549 A | 7/1996 | Kato et al. | 106/20 C |
| 5,716,435 A | 2/1998 | Aida et al. | 106/31.85 |
| 5,792,559 A | 8/1998 | Heithoff et al. | 428/437 |
| 5,837,041 A | 11/1998 | Bean et al. | 106/31.6 |
| 5,902,711 A | 5/1999 | Smith et al. | 430/137 |
| 5,942,027 A | 8/1999 | Ikai et al. | 106/31.33 |
| 5,990,219 A | 11/1999 | Sakai et al. | 524/441 |
| 6,030,440 A | 2/2000 | Sekioka et al. | 106/31.65 |
| 6,031,024 A | 2/2000 | Uraki et al. | 523/161 |
| 6,099,627 A | 8/2000 | Saibara et al. | 106/31.33 |
| 6,153,001 A | 11/2000 | Suzuki et al. | 106/31.65 |
| 6,337,131 B1 | 1/2002 | Rupaner et al. | 428/403 |
| 6,387,997 B1 | 5/2002 | Grolemund et al. | 524/506 |
| 6,410,619 B2 | 6/2002 | Greene et al. | 524/88 |
| 6,416,818 B1 | 7/2002 | Aikens et al. | 427/383.1 |
| 6,417,249 B1 | 7/2002 | Nguyen et al. | 523/201 |
| 6,624,276 B2 | 9/2003 | Lamers et al. | 528/45 |
| 6,635,693 B2 * | 10/2003 | Wang et al. | 523/211 |
| 6,666,983 B2 | 12/2003 | Marietti et al. | 216/75 |
| 2002/0086168 A1 | 7/2002 | Sadvary et al. | 428/447 |
| 2002/0149002 A1 | 10/2002 | Womelsdorf et al. | 252/363.5 |
| 2002/0193514 A1 | 12/2002 | Wang et al. | 524/853 |
| 2003/0125416 A1 | 7/2003 | Munro et al. | 523/171 |
| 2003/0125417 A1 | 7/2003 | Vanier et al. | 523/171 |
| 2004/0156994 A1 | 8/2004 | Wiese et al. | 427/372.2 |
| 2005/0159523 A1 | 7/2005 | Bremser et al. | 524/431 |
| 2005/0182169 A1 | 8/2005 | Stubbe et al. | 524/379 |
| 2005/0212159 A1 | 9/2005 | Richards et al. | 264/40.7 |
| 2005/0212171 A1 | 9/2005 | Ferencz et al. | 264/211.21 |
| 2005/0213423 A1 | 9/2005 | Ferencz et al. | 366/76.2 |
| 2005/0287348 A1 | 12/2005 | Faler et al. | 428/315.5 |
| 2006/0191442 A1 | 8/2006 | He et al. | 106/499 |
| 2006/0246305 A1 | 11/2006 | Cheng et al. | 428/447 |
| 2006/0251896 A1 | 11/2006 | Ferencz et al. | 428/407 |
| 2006/0252881 A1 | 11/2006 | DeSaw et al. | 524/847 |

FOREIGN PATENT DOCUMENTS

| | | |
|---|---|---|
| EP | 0 955 323 A1 | 11/1999 |
| EP | 1006161 A1 | 6/2000 |
| EP | 1 245 589 A1 | 10/2002 |
| EP | 1371694 A2 | 12/2003 |
| WO | WO 02/14391 A2 | 2/2002 |
| WO | WO 03/095532 A1 | 11/2003 |
| WO | WO 03/095571 A1 | 11/2003 |
| WO | WO 04/000916 A2 | 12/2003 |
| WO | WO 2004/098793 A2 | 11/2004 |

* cited by examiner

*Primary Examiner*—Edward J Cain
(74) *Attorney, Agent, or Firm*—Donald R. Palladino

(57) ABSTRACT

Disclosed are composite transparencies and methods for their production. The colored composite transparencies include a surface at least partially coated with a transparent tinted coating deposited from a coating composition comprising polymer-enclosed color-imparting particles.

14 Claims, 1 Drawing Sheet

COMPOSITE TRANSPARENCIES

CROSS-REFERENCE TO RELATED APPLICATIONS

This application is a continuation-in-part of U.S. patent application Ser. No. 11/337,062, filed Jan. 20, 2006 and entitled, "Aqueous Dispersions Of Polymer-Enclosed Particles, Related Coating Compositions And Coated Substrates", which is a continuation-in-part of U.S. patent application Ser. No. 10/876,031, filed Jun. 24, 2004 entitled, "Aqueous Dispersions of Microparticles Having a Nanoparticulate Phase and Coating Compositions Containing The Same", which claims the benefits of U.S. Provisional Application Ser. No. 60/482,167 filed Jun. 24, 2003, each of which are incorporated herein by reference.

FIELD OF THE INVENTION

The present invention relates to colored composite transparencies that exhibit a desired color and methods for their production. The present invention also relates to transparencies exhibiting varying desired shades of a color and methods for their production.

BACKGROUND INFORMATION

It is often desirable, for aesthetic and other reasons, to provide transparent articles, such as architectural windows, automotive windows, eyewear lenses, and the like, that exhibit a desired color, i.e., tint. Such color is sometimes obtained by the use of dyes that are included in the composition used to manufacture the glass or transparent plastic material. Alternatively, a colored coating containing a dye may be deposited upon the material. Pigments are typically avoided because they typically produce hazy or opaque materials with reduced transparency.

Dyes, however, while often suitable for use in preparing colored transparent articles, also suffer from some drawbacks. Dyes are subject to degradation by visible light and/or ultraviolet light. As a result, materials colored with dyes are typically less durable and exhibit less lightfastness than comparable materials colored with pigments.

As a result, it would be desirable to provide colored composite transparencies that exhibit color durability and lightfastness typical of pigmented materials while still exhibiting the transparency typical of a dye containing material.

SUMMARY OF THE INVENTION

In certain respects, the present invention is directed to composite transparencies comprising a surface at least partially coated with a transparent tinted coating deposited from a coating composition comprising polymer-enclosed color-imparting particles. In these composite transparencies, the polymer-enclosed color-imparting particles are derived from an aqueous dispersion that is prepared by a method comprising: (A) providing a mixture, in an aqueous medium, of (i) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or (B) providing a mixture, in an aqueous medium, of (i) color-imparting particles, (ii) a polymerizable ethylenically unsaturated monomer, and (iii) a water-dispersible polymerizable dispersant; forming the color-imparting particles into nanoparticles; and polymerizing the ethylenically unsaturated monomer and the polymerizable dispersant to form polymer-enclosed color-imparting particles comprising a water-dispersible polymer.

In other respects, the present invention is directed to composite transparencies exhibiting a plurality of hues. These composite transparencies comprise a surface at least partially coated with a transparent tinted coating deposited from a coating composition comprising an aqueous dispersion of polymer-enclosed color-imparting particles, wherein the coating has a plurality of thicknesses. The aqueous dispersion is prepared by a method comprising: (A) providing a mixture, in an aqueous medium, of (i) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or (B) providing a mixture, in an aqueous medium, of (i) color-imparting particles, (ii) a polymerizable ethylenically unsaturated monomer, and (iii) a water-dispersible polymerizable dispersant; forming the color-imparting particles into nanoparticles; and polymerizing the ethylenically unsaturated monomer and the polymerizable dispersant to form polymer-enclosed color-imparting particles comprising a water-dispersible polymer.

In yet other respects, the present invention is directed to composite transparencies comprising a first surface at least partially coated with a transparent tinted coating having a first hue and deposited from a coating composition comprising polymer-enclosed color-imparting particles derived from a first aqueous dispersion of polymer-enclosed color-imparting particles, and a second surface opposing the first surface, wherein the second surface is at least partially coated with a transparent tinted coating having a second hue and deposited from a coating composition comprising polymer-enclosed color-imparting particles derived from a second aqueous dispersion of polymer-enclosed color-imparting particles. The first and/or second aqueous dispersion is prepared by a method comprising: (A) providing a mixture, in an aqueous medium, of (i) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or (B) providing a mixture, in an aqueous medium, of (i) color-imparting particles, (ii) a polymerizable ethylenically unsaturated monomer, and (iii) a water-dispersible polymerizable dispersant; forming the color-imparting particles into nanoparticles; and polymerizing the ethylenically unsaturated monomer and polymerizable dispersant to form polymer-enclosed color-imparting particles comprising a water-dispersible polymer.

In still other respects, the present invention is directed to composite transparencies at least partially coated with a multi-layer coating comprising: (a) a first tinted coating deposited from a coating composition comprising polymer-enclosed color-imparting particles, and (b) a second layer deposited over at least a portion of the first layer and comprising a hard coat deposited from a composition comprising an alkoxide of the general formula $R_xM(OR')_{z-x}$, wherein R is an organic radical, M is selected from the group consisting of silicon, aluminum, titanium, zirconium and mixtures thereof, R' is a low molecular weight alkyl radical, z is the valence of M and x is a number less than z and may be zero.

The present invention is also directed to, for example, tinted glass units, such as architectural units and automotive glass units, as well as related methods.

DETAILED DESCRIPTION OF THE INVENTION

Figure 1:
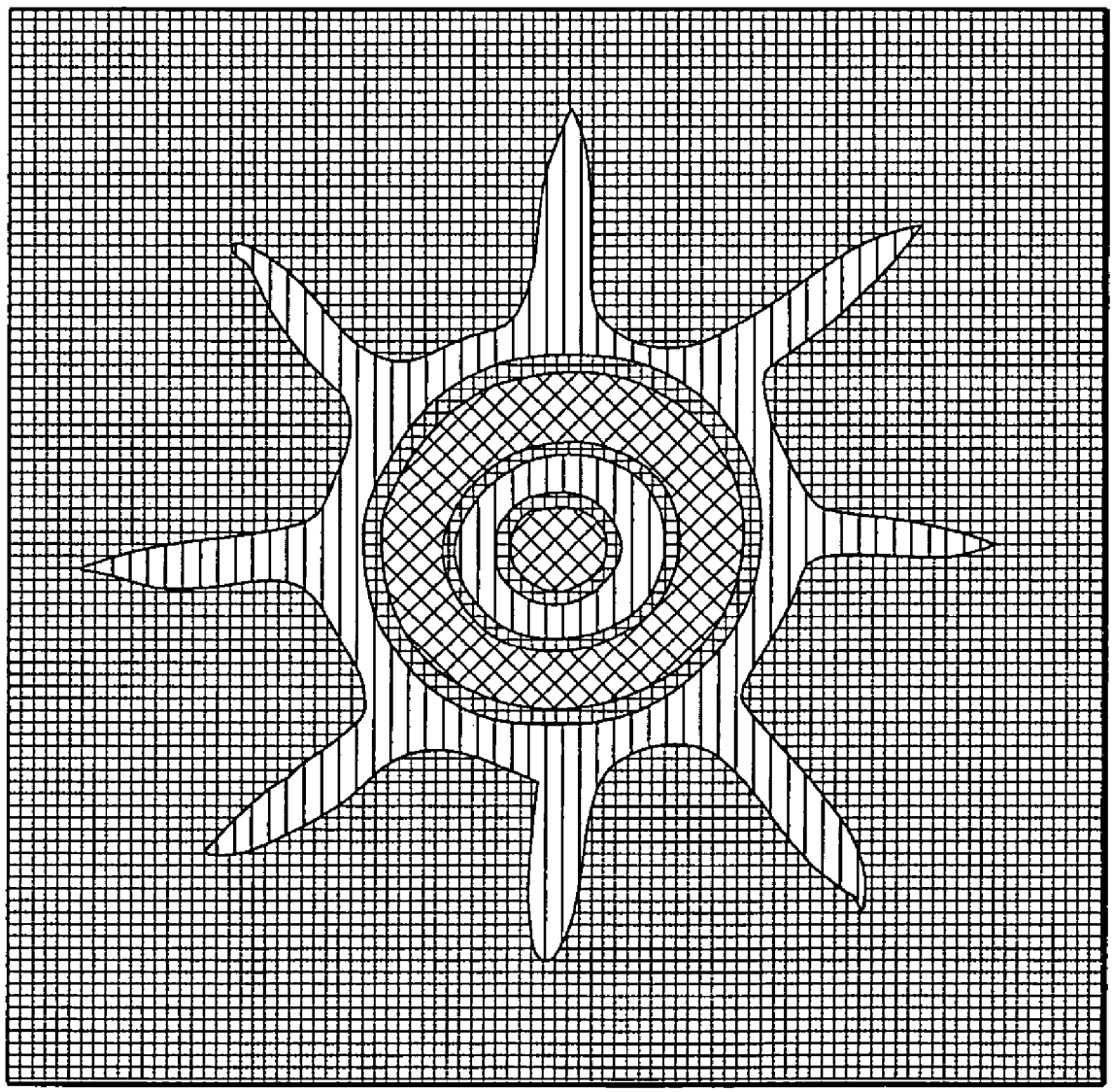
FIG. 1 is an illustration of the coaster prepared in Example 17.

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As previously mentioned, certain embodiments of the present invention are directed to composite transparencies comprising a surface at least partially coated with a transparent tinted coating deposited from a coating composition comprising polymer-enclosed color-imparting particles. As used herein, the term "composite transparency", refers to a transparent article with a second element, such as a coating, attached thereto. As used herein, the term "tinted" when referring to, for example, an article or a coating refers to an article or coating that absorbs some wavelengths of visible light (400 to 700 nanometers) more than it absorbs other wavelengths in the visible region. As used herein, "transparent", when referring to an article or a coated article, means that a surface beyond the article is visible to the naked eye when viewed through the article. Depending upon the desired application, such a transparent article can have relatively low transmission, i.e., a spectral transmission of no more than 50% or, in some cases, no more than 10%, or, in yet other cases, no more than 5%, while, in other cases, the transparent article can have a relatively high transmission, i.e., a spectral transmission of more than 50%, in some cases at least 60%, or, in yet other cases, at least 80%. The foregoing spectral transmission values being measured at a wavelength ranging from 410 nanometers to 700 nanometers, based upon ASTM Standard No. D-1003 using a Hunter Lab COLORQUEST® II Sphere spectrophotometer that is available from Hunter Associates Laboratory, Inc. of Reston, Va. The transparency values reported herein are obtained using visible light with a wavelength ranging from about 410 nanometers to about 700 nanometers. All percentage transmittance and all percentage haze determinations are based on samples having a dry film thickness as specified in the Examples.

The transparent articles of the composite transparencies of the present invention can be formed from a variety of materials. In certain embodiments of the present invention, the article comprises a rigid material, such as glass, including float glass. In certain embodiments of the present invention, the article comprises a flexible material, such as a polymeric material. Examples of polymeric materials suitable for such articles include, but are not limited to, thermoplastic materials, such as polycarbonates, acrylonitrile butadiene styrene, blends of polyphenylene ether and polystyrene, polyetherimides, polyesters, polysulfones, acrylics, and copolymers and/or blends of any of these. As discussed in more detail below, certain of these articles can have a textured or roughened surface. Such surfaces can be prepared by any suitable method, such as any sandblasting or etching process known to those skilled in the art.

The composite transparencies of the present invention comprise a surface at least partially coated with a transparent tinted coating deposited from a coating composition comprising polymer-enclosed color-imparting particles. As used herein, the term "polymer-enclosed particles" refers to particles that are at least partially enclosed by, i.e., confined within, a polymer to an extend sufficient to separate particles from each other within the resulting coating, such that significant agglomeration of the particles is prevented. It will be appreciated, of course, that a coating composition comprising such "polymer-enclosed particles" may also include particles that are not polymer-enclosed particles. As used herein, the term "color-imparting particle" refers to a particle that significantly absorbs some wavelengths of visible light, that is, wavelengths ranging from 400 to 700 nanometers, more than it absorbs other wavelengths in the visible region.

In certain embodiments, the particles that are enclosed by a polymer comprise nanoparticles. As used herein, the term "nanoparticle" refers to a particle that has a particle size of less than 1 micron. In certain embodiments, the nanoparticles used in the present invention have an average particles size of 300 nanometers or less, such as 200 nanometers or less, or, in some cases, 100 nanometers or less.

For purposes of the present invention, average particle size can be measured according to known laser scattering techniques. For example, average particle size can be determined using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measure particles based on magnification of the TEM image. One or ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

The shape (or morphology) of the polymer-enclosed color-imparting particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls.

Depending on the desired properties and characteristics of the resultant coating composition (e.g., coating hardness, scratch resistance, stability, or color), it will be recognized by one skilled in the art that mixtures of one or more polymer-enclosed color-imparting particles having different average particle sizes can be employed.

The polymer-enclosed color-imparting particles can be formed from polymeric and/or nonpolymeric inorganic materials, polymeric and/or nonpolymeric organic materials, composite materials, as well as mixtures of any of the foregoing. As used herein, "formed from" denotes open, e.g., "comprising," claim language. As such, it is intended that a composition or substance "formed from" a list of recited components be a composition comprising at least these recited components, and can further comprise other, non-recited components, during the composition's formation. Additionally, as used herein, the term "polymer" is meant to encompass oligomers, and includes without limitation both homopolymers and copolymers.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In certain embodiments, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202.

As aforementioned, the particles useful in the present invention can include any inorganic materials known in the art. Suitable particles can be formed from ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the particles comprise inorganic materials selected from aluminum, barium, bismuth, boron, cadmium, calcium, cerium, cobalt, copper, iron, lanthanum, magnesium, manganese, molybdenum, nitrogen, oxygen, phosphorus, selenium, silicon, silver, sulfur, tin, titanium, tungsten, vanadium, yttrium, zinc, and zirconium, including oxides thereof, nitrides thereof, phosphides thereof, phosphates thereof, selenides thereof, sulfides thereof, sulfates thereof, and mixtures thereof. Suitable non-limiting examples of the foregoing inorganic particles are alumina, silica, titania, ceria, zirconia, bismuth oxide, magnesium oxide, iron oxide, aluminum silicate, boron carbide, nitrogen doped titania, and cadmium selenide.

The particles can comprise, for example, a core of essentially a single inorganic oxide, such as silica in colloidal, filmed, or amorphous form, alumina or colloidal alumina, titanium dioxide, iron oxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type.

Non-polymeric, inorganic materials useful in forming the particles used in the present invention can comprise inorganic materials selected from graphite, metals, oxides, carbides, nitrides, borides, sulfides, silicates, carbonates, sulfates, and hydroxides. A non-limiting example of a useful inorganic oxide is zinc oxide. Non-limiting examples of suitable inorganic sulfides include molybdenum disulfide, tantalum disulfide, tungsten disulfide, and zinc sulfide. Non-limiting examples of useful inorganic silicates include aluminum silicates and magnesium silicates, such as vermiculite. Non-limiting examples of suitable metals include molybdenum, platinum, palladium, nickel, aluminum, copper, gold, iron, silver, alloys, and mixtures of any of the foregoing.

In certain embodiments, the particles are selected from fumed silica, amorphous silica, colloidal silica, alumina, colloidal alumina, titanium dioxide, iron oxide, cesium oxide, yttrium oxide, colloidal yttria, zirconia, colloidal zirconia, and mixtures of any of the foregoing. In certain embodiments, the particles comprise colloidal silica. As disclosed above, these materials can be surface treated or untreated. Other useful particles include surface-modified silicas, such as are described in U.S. Pat. No. 5,853,809 at column 6, line 51 to column 8, line 43, incorporated herein by reference.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material, such as silicon carbide or aluminum nitride, can be provided with a silica, carbonate or nanoclay coating to form a useful composite particle. In another non-limiting example, a silane coupling agent with alkyl side chains can interact with the surface of an inorganic particle formed from an inorganic oxide to provide a useful composite particle having a "softer" surface. Other examples include cladding, encapsulating or coating particles formed from non-polymeric or polymeric materials with differing non-polymeric or polymeric materials. A specific non-limiting example of such composite particles is DUALITE™, which is a synthetic polymeric particle coated with calcium carbonate that is commercially available from Pierce and Stevens Corporation of Buffalo, N.Y.

In certain embodiments, the particles used in the present invention have a lamellar structure. Particles having a lamellar structure are composed of sheets or plates of atoms in hexagonal array, with strong bonding within the sheet and weak van der Waals bonding between sheets, providing low shear strength between sheets. A non-limiting example of a lamellar structure is a hexagonal crystal structure. Inorganic solid particles having a lamellar fullerene (i.e., buckyball) structure are also useful in the present invention.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum diselenide, tantalum disulfide, tantalum diselenide, tungsten disulfide, tungsten diselenide and mixtures thereof.

The particles can be formed from non-polymeric, organic materials. Non-limiting examples of non-polymeric, organic materials useful in the present invention include, but are not limited to, stearates (such as zinc stearate and aluminum stearate), diamond, carbon black and stearamide.

The particles used in the present invention can be formed from inorganic polymeric materials. Non-limiting examples of useful inorganic polymeric materials include polyphosphazenes, polysilanes, polysiloxanes, polygermanes, polymeric sulfur, polymeric selenium, silicones and mixtures of any of the foregoing. A specific, non-limiting example of a particle formed from an inorganic polymeric material suitable for use in the present invention is Tospearl, which is a particle formed from cross-linked siloxanes and is commercially available from Toshiba Silicones Company, Ltd. of Japan.

The particles can be formed from synthetic, organic polymeric materials. Non-limiting examples of suitable organic polymeric materials include, but are not limited to, thermoset materials and thermoplastic materials. Non-limiting examples of suitable thermoplastic materials include thermoplastic polyesters, such as polyethylene terephthalate, polybutylene terephthalate and polyethylene naphthalate, polycarbonates, polyolefins, such as polyethylene, polypropylene and polyisobutene, acrylic polymers, such as copolymers of styrene and an acrylic acid monomer and polymers containing methacrylate, polyamides, thermoplastic polyurethanes, vinyl polymers, and mixtures of any of the foregoing.

Non-limiting examples of suitable thermoset materials include thermoset polyesters, vinyl esters, epoxy materials, phenolics, aminoplasts, thermoset polyurethanes and mixtures of any of the foregoing. A specific, non-limiting example of a synthetic polymeric particle formed from an epoxy material is an epoxy microgel particle.

The particles can also be hollow particles formed from materials selected from polymeric and non-polymeric inorganic materials, polymeric and non-polymeric organic materials, composite materials and mixtures of any of the foregoing. Non-limiting examples of suitable materials from which the hollow particles can be formed are described above.

In certain embodiments, the particles used in the present invention comprise an organic pigment, for example, azo compounds (monoazo, di-azo, β-Naphthol, Naphthol AS, azo pigment lakes, benzimidazolone, di-azo condensation, metal complex, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures thereof.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4,9,10-tetracarboxylic acid are often used. Crude perylenes can be prepared by methods known in the art.

Phthalocyanine pigments, especially metal phthalocyanines may be used. Although copper phthalocyanines are more readily available, other metal-containing phthalocyanine pigments, such as those based on zinc, cobalt, iron, nickel, and other such metals, may also be used. Metal-free phthalocyanines are also suitable. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Phthalocyanines may be prepared by any of several methods known in the art. They are typically prepared by a reaction of phthalic anhydride, phthalonitrile, or derivatives thereof, with a metal donor, a nitrogen donor (such as urea or the phthalonitrile itself), and an optional catalyst, often in an organic solvent.

Quinacridone pigments, as used herein, include unsubstituted or substituted quinacridones (for example, with one or more alkyl, alkoxy, halogens such as chlorine, or other substituents typical of quinacridone pigments), and are suitable for use in the present invention. The quinacridone pigments may be prepared by any of several methods known in the art, such as by thermally ring-closing various 2,5-dianilinoterephthalic acid precursors in the presence of polyphosphoric acid.

Isoindoline pigments, which can optionally be substituted symmetrically or unsymmetrically, are also suitable for the practice of the present invention can be prepared by methods known in the art. A suitable isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art.

Mixtures of any of the previously described inorganic particles and/or organic particles can also be used.

If desired, the particles described above can be formed into nanoparticles. In certain embodiments, the nanoparticles are formed in situ during formation of an aqueous dispersion of polymer-enclosed particles, as described in more detail below. In other embodiments, however, the nanoparticles are formed prior to their incorporation into such an aqueous dispersion. In these embodiments, the nanoparticles can be formed by any of a number of various methods known in the art. For example, the nanoparticles can be prepared by pulverizing and classifying the dry particulate material. For example, bulk pigments such as any of the inorganic or organic pigments discussed above, can be milled with milling media having a particle size of less than 0.5 millimeters (mm), or less than 0.3 mm, or less than 0.1 mm. The pigment particles typically are milled to nanoparticle sizes in a high energy mill in one or more solvents (either water, organic solvent, or a mixture of the two), optionally in the presence of a polymeric grind vehicle. If necessary, a dispersant can be included, for example, (if in organic solvent) SOLSPERSE® 32000 or 32500 available from Lubrizol Corporation, or (if in water) SOLSPERSE® 27000, also available from Lubrizol Corporation. Other suitable methods for producing the nanoparticles include crystallization, precipitation, gas phase condensation, and chemical attrition (i.e., partial dissolution).

In certain embodiments, the coating composition comprises polymer-enclosed color-imparting particles that are formed from an aqueous dispersion of polymer-enclosed color-imparting particles. As used herein, the term "dispersion" refers to a two-phase system in which one phase includes finely divided particles distributed throughout a second phase, which is a continuous phase. The dispersions often are oil-in-water emulsions, wherein an aqueous medium provides the continuous phase of the dispersion in which the polymer-enclosed particles are suspended as the organic phase.

As used herein, the term "aqueous", "aqueous phase", "aqueous medium," and the like, refers to a medium that either consists exclusively of water or comprises predominantly water in combination with another material, such as, for example, an inert organic solvent. In certain embodiments, the amount of organic solvent present in the aqueous dispersions is less than 20 weight percent, such as less than 10 weight percent, or, in some cases, less than 5 weight percent, or, in yet other cases, less than 2 weight percent, with the weight percents being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

The polymer-enclosed color-imparting particles used in the present invention may comprise, for example, a polymer selected from acrylic polymers, polyurethane polymers, polyester polymers, polyether polymers, silicon-based polymers, co-polymers thereof, and mixtures thereof. Such polymers can be produced by any suitable method known to those skilled in the art to which the present invention pertains. Suitable polymers are disclosed in U.S. patent application Ser. No. 10/876,031 at [0061] to [0076], U.S. patent application Publication No. 2005/0287348 A1 at [0042] to [0044], and U.S. patent application Ser. No. 11/337,062 at [0054] to [0079], the cited portions of which being incorporated by reference herein.

The previously-described aqueous dispersions of polymer-enclosed color-imparting particles can be prepared by any of a variety of methods. For example, in certain embodiments, the aqueous dispersion is prepared by a method comprising (A) providing a mixture, in an aqueous medium, of (i) color-imparting particles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles. Such methods are described in detail in U.S. patent application Ser. No. 10/876,031 at [0054] to [0090], the cited portion of which being incorporated by reference herein.

In certain embodiments, however, the aqueous dispersions are made by a method comprising (1) providing a mixture, in an aqueous medium, of (i) color-imparting particles, (ii) a polymerizable ethylenically unsaturated monomer, and (iii) a water-dispersible polymerizable dispersant, and (2) polymerizing the ethylenically unsaturated monomer and polymerizable dispersant to form polymer-enclosed color-imparting particles comprising a water-dispersible polymer. In these embodiments, the polymerizable dispersant may comprise any polymerizable material that is water-dispersible and which, upon polymerization with the ethylenically unsaturated monomer, produces polymer-enclosed color-imparting particles comprising a water-dispersible polymer. In certain embodiments, the polymerizable dispersant comprises a water-dispersible, polymerizable polyester polyurethane having terminal ethylenic unsaturation.

In these embodiments, the water-dispersible polymerizable dispersant is capable is dispersing itself and other materials, including the ethylenically unsaturated monomers, in the aqueous medium without the need for surfactants and/or high shear conditions. As a result, the foregoing method for making an aqueous dispersion of polymer-enclosed color-imparting particles is particularly suitable in situations where use of high stress shear conditions, as described in U.S. patent application Ser. No. 10/876,031, is not desired or feasible. Therefore, in certain embodiments, the aqueous dispersion of polymer-enclosed color-imparting particles is prepared by a method that does not include the step of subjecting the mixture of color-imparting particles, polymerizable ethylenically unsaturated monomer, and water-dispersible polymerizable dispersant to high stress shear conditions.

In certain embodiments, the color-imparting particles, after being mixed with the ethylenically unsaturated monomer and the water-dispersible polymerizable dispersant in the aqueous medium, are formed into color-imparting nanoparticles (i.e., the nanoparticles are formed in situ). In certain embodiments, the color-imparting nanoparticles are formed by subjecting the aqueous medium to pulverizing conditions. For example, the particles can be milled with milling media having a particle size of less than 0.5 millimeters, or less than 0.3 millimeters, or, in some cases, less than 0.1 millimeters. In these embodiments, the color-imparting particles can be milled to nanoparticle size in a high energy mill in the presence of the aqueous medium, the polymerizable ethylenically unsaturated monomer, and the water-dispersible polymerizable dispersant. If desired, other dispersant can be used, such as SOLSPERSE 27000, available from Avecia, Inc.

As indicated, the foregoing methods for making aqueous dispersions of polymer-enclosed color-imparting particles include the step of polymerizing the ethylenically unsaturated monomer and polymerizable dispersant to form polymer-enclosed color-imparting particles. In certain embodiments, at least a portion of the polymerization occurs during formation of nanoparticles, if applicable. A free radical initiator is often used. Both water and oil soluble initiators can be used.

Non-limiting examples suitable water-soluble initiators include ammonium peroxydisulfate, potassium peroxydisulfate and hydrogen peroxide. Non-limiting examples of oil soluble initiators include t-butyl hydroperoxide, dilauryl peroxide and 2,2'-azobis(isobutyronitrile). In many cases, the reaction is carried out at a temperature ranging from 20° to 80° C. The polymerization can be carried out in either a batch or a continuous process. The length of time necessary to carry out the polymerization can range from, for example, 10 minutes to 6 hours, provided that the time is sufficient to form a polymer in situ from the one or more ethylenically unsaturated monomers.

Once the polymerization process is complete, the resultant product is a stable dispersion of polymer-enclosed color-imparting particles in an aqueous medium which can contain some organic solvent. Some or all of the organic solvent can be removed via reduced pressure distillation at a temperature, for example, of less than 40° C. As used herein, the term "stable dispersion" or "stably dispersed" means that the polymer-enclosed color-imparting particles neither settle nor coagulate nor flocculate from the aqueous medium upon standing.

In certain embodiments, the polymer-enclosed particles are present in the aqueous dispersions in an amount of at least 10 weight percent, or in an amount of 10 to 80 weight percent, or in an amount of 25 to 50 weight percent, or in an amount of 25 to 40 weight percent, with weight percents being based on weight of total solids present in the dispersion.

As indicated, for purposes of the present invention, the polymer-enclosed color-imparting particles are incorporated into a coating composition. Suitable coating compositions include thermoplastic compositions or thermosetting (i.e.) curable compositions. As used herein, by "thermosetting material" or "thermosetting composition" is meant one which "sets" irreversibly upon curing or crosslinking, wherein the polymer chains of the polymeric components are joined together by covalent bonds. This property is usually associated with a cross-linking reaction of the composition constituents often induced, for example, by heat or radiation. Hawley, Gessner G., The Condensed Chemical Dictionary, Ninth Edition., page 856; Surface Coatings, vol. 2, Oil and Colour Chemists' Association, Australia, TAFE Educational Books (1974). Once cured or crosslinked, a thermosetting material or composition will not melt upon the application of heat and is insoluble in solvents. By contrast, a "thermoplastic material" or "thermoplastic composition" comprises polymeric components which are not joined by covalent bonds and thereby can undergo liquid flow upon heating and are soluble in solvents. Saunders, K. J., Organic Polymer Chemistry, pp. 41-42, Chapman and Hall, London (1973).

In certain embodiments, the aqueous dispersions comprising polymer-enclosed color-imparting particles can represent the primary film-forming component of such coating compositions, or, in some cases, the aqueous dispersion represents only one of the components in the coating composition. For example, in addition to the aqueous dispersion, such coating compositions also may include a resinous binder system comprising one or more film-forming polymers which may or may not include reactive functional groups, and/or, if appropriate, a crosslinking agent having functional groups reactive with those of the film-forming polymer. Suitable film-forming polymers include, for example, any of those polymers discussed above with respect to the aqueous dispersion of polymer-enclosed color-imparting particles.

In certain embodiments, such a film-forming polymer comprises reactive functional groups. Such polymers typically are used in conjunction with a curing agent, and can include, for example, hydroxyl, epoxy, carbamate, amino or carboxylic acid group-containing acrylic copolymers; hydroxyl or carboxylic acid-containing polyester polymers and oligomers; and isocyanate or hydroxyl-containing polyurethane polymers, or amine or isocyanate-containing polyureas which can enhance cure rate, appearance and other physical properties of the cured coating.

Curing agents suitable for use in the curable coating composition of the present invention can include aminoplast resins and phenoplast resins and mixtures thereof, as curing agents for hydroxyl, carboxyl, amide, and carbamate functional group containing materials, as described in, for example, U.S. Pat. No. 3,919,351 at col. 5, line 22 to col. 6, line 25, the cited portion of which being incorporated herein by reference. Also suitable are polyisocyanates and blocked polyisocyanates as curing agents for hydroxyl and primary and/or secondary amino group-containing materials, as described, for example, in U.S. Pat. No. 4,546,045 at col. 5, lines 16 to 38; and in U.S. Pat. No. 5,468,802 at col. 3, lines 48 to 60, the cited portions of which being incorporated herein by reference. Anhydrides as curing agents for hydroxyl and primary and/or secondary amino group containing materials are suitable, and are described, for example, in U.S. Pat. No. 4,798,746 at col. 10, lines 16 to 50; and in U.S. Pat. No. 4,732,790 at col. 3, lines 41 to 57, the cited portions of which being incorporated by reference. Polyepoxides as curing agents for carboxyl functional group containing materials are suitable, and are described, for example, in U.S. Pat. No. 4,681,811 at col. 5, lines 33 to 58, the cited portion of which being incorporated herein by reference. Polyacids as curing agents for epoxy functional group containing materials are suitable, and are described, for example, in U.S. Pat. No. 4,681,811 at col. 6, line 45 to col. 9, line 54, the cited portion of which being incorporated herein by reference. Polyols as curing agents for isocyanate functional group containing materials and anhydrides and esters are suitable, and are described, for example, in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, the cited portions of which being incorporated herein by reference. Polyamines as curing agents for isocyanate functional group containing materials and for carbonates and unhindered esters are suitable and are described, for example, in U.S. Pat. No. 4,046,729 at col. 6, line 61 to col. 7, line 26, the cited portion of which being incorporated herein by reference.

When desired, appropriate mixtures of curing agents may be used. In certain embodiments, the coating compositions described herein are formulated as a one-component composition where a curing agent, such as an aminoplast resin and/or a blocked isocyanate compound, is admixed with other composition components. The one-component composition can be storage stable as formulated. Alternatively, compositions can be formulated as a two-component composition where, for example, a polyisocyanate curing agent, can be added to a pre-formed admixture of the other composition components just prior to application. The pre-formed admixture can comprise curing agents for example, aminoplast resins and/or blocked isocyanate compounds such as those described above.

The coating compositions also may comprise optional ingredients such as those well known in the art of formulating surface coatings, so long as the resultant coating is tinted and transparent. Such optional ingredients can comprise, for example, colorants (pigments and/or dyes), surface active agents, flow control agents, thixotropic agents, fillers, anti-gassing agents, organic co-solvents, catalysts, and other customary auxiliaries. Nonlimiting examples of these materials and suitable amounts are described in U.S. Pat. Nos. 4,220,679; 4,403,003; 4,147,769; and 5,071,904.

In certain embodiments, the coating compositions of the present invention also comprise a silane coupling agent. Useful silane coupling agents include glycidyl, isocyanato, amino or carbamyl functional silane coupling agents. The present inventors have discovered that the inclusion of such a coupling agent to the coating compositions of the present invention can result in the production of a glass article having a tinted coating deposited thereon, wherein the coating adheres to the glass article even under wet conditions, such as would be experienced in a dishwasher.

The coating compositions can be applied to the article by any suitable technique, such as spraying, brushing, spin-coating, dip coating and use of a draw-down blade or wire bar. In certain embodiments, particular when a spin-coating application technique is used, the coating composition is applied to the transparent article in the form of a very thin film, i.e., a dry film thickness of 0.05 to 0.3 mils (2-5 microns) is achieved. One particular advantage of the present invention is that a transparent coating exhibiting a relatively low transmission, in some cases, a spectral transmission of no more than 10%, or, in some cases, no more than 5%, can be achieved using such very thin films, unlike transparent coatings that utilize, for example, dyes for coloration. As a result, improved optical quality can be achieved for such coatings, due to the use of thinner films.

As previously indicated, in certain embodiments of the present invention, the composite transparency comprises a glass article. For example, in certain embodiments, the glass article comprises an architectural glass unit, i.e., glass used in an architectural applications, such as, for example, windows. As a result, in certain embodiments, the present invention is also directed to a method for reducing the transmission of solar energy through a transparent architectural glass unit, wherein the method comprises applying a coating composition of the present invention to at least a portion of a surface of the unit. In other embodiments, the glass article comprises automotive glass. As a result, the present invention is also directed to methods for providing a tinted automotive glass unit, wherein the method comprises, for example, post bend application of a coating composition of the present invention to at least a portion of a surface of the unit.

The coating compositions described above may be used to form a single coating layer on a transparent article, such a layer being referred to herein as a transparent tinted coating. In certain embodiments, however, another coating layer, such as a hard coat, may be deposited over at least a portion of the transparent colorant layer. As a result, the present invention is also directed to composite transparencies at least partially coated with a multi-layer coating comprising: (a) a first tinted coating deposited from a coating composition comprising polymer-enclosed color-imparting particles, and (b) a second layer comprising a hard coat.

As used herein, the term "hard coat" refers to a coating layer that offers one or more of chip resistance, impact resistance, abrasion resistance, UV degradation resistance, humidity resistance, and/or chemical resistance. In certain embodiments, the hard coat is deposited from a composition comprising an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero. Examples of suitable organic radicals include, but are not limited to, alkyl, vinyl, methoxyalkyl, phenyl, γ-glycidoxy propyl and γ-methacryloxy propyl. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, which are incorporated by reference herein.

In certain embodiments, the alkoxide comprises a combination of a glycidoxy[$(C_1$-$C_3)$alkyl]tri$(C_1$-$C_4)$alkoxysilane monomer and a tetra$(C_1$-$C_6)$alkoxysilane monomer. Glycidoxy[$(C_1$-$C_3)$alkyl]tri$(C_1$-$C_4)$alkoxysilane monomers suitable for use in the coating compositions of the present invention include glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxy-propyltrimethoxysilane, α-glycidoxypropyltriethoxysilane, β-glycidoxypropyltrimethoxysilane, β-glycidoxypropyl-triethoxysilane, γ-glycidoxypropyltrimethoxysilane, hydrolysates thereof, and/or mixtures of such silane monomers.

Suitable tetra$(C_1$-$C_6)$alkoxysilanes that may be used in combination with the glycidoxy[$(C_1$-$C_3)$alkyl]tri$(C_1$-$C_4)$ alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane and mixtures thereof.

In certain embodiments, the glycidoxy[$(C_1$-$C_3)$alkyl]tri $(C_1$-$C_4)$alkoxysilane and tetra$(C_1$-$C_6)$alkoxysilane monomers used in the coating compositions of the present invention are present in a weight ratio of glycidoxy [$(C_1$-$C_3)$alkyl]tri$(C_1$-$C_4)$alkoxysilane to tetra$(C_1$-$C_6)$alkoxysilane of from 0.5:1 to 100:1, such as 0.75:1 to 50:1 and, in some cases, from 1:1 to 5:1.

In certain embodiments, the alkoxide is at least partially hydrolyzed before it is combined with other components of the coating composition, such as the polymer-enclosed color-imparting particles. Such a hydrolysis reaction is described in U.S. Pat. No. 6,355,189 at col. 3, lines 7 to 28, the cited portion of which being incorporated by reference herein.

In certain embodiments, water is provided in an amount necessary for the hydrolysis of the hydrolyzable alkoxide(s). For example, in certain embodiments, water is present in an amount of at least 1.5 moles of water per mole of hydrolyzable alkoxide. In certain embodiments, atmospheric moisture, if sufficient, can be adequate.

In certain embodiments, a catalyst is provided to catalyze the hydrolysis and condensation reaction. In certain embodiments, the catalyst is an acidic material and/or a material, different from the acidic material, which generates an acid upon exposure to actinic radiation. In certain embodiments, the acidic material is chosen from an organic acid, inorganic acid or mixture thereof. Non-limiting examples of such materials include acetic, formic, glutaric, maleic, nitric, hydrochloric, phosphoric, hydrofluoric, sulfuric acid or mixtures thereof.

Any material that generates an acid on exposure to actinic radiation can be used as a hydrolysis and condensation catalyst in the coating compositions of the present invention, such as a Lewis acid and/or a Bronsted acid. Non-limiting examples of acid generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters and end-capped derivatives described in U.S. Pat. No. 4,086,210, sulphonate esters or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In certain embodiments, the acid generating compound is a cationic photoinitiator, such as an onium salt. Non-limiting examples of such materials include diaryliodonium salts and triarylsulfonium salts, which are commercially available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate and mixtures thereof.

The amount of catalyst used in the coating compositions of the present invention can vary widely and depend on the particular materials used. Only the amount required to catalyze and/or initiate the hydrolysis and condensation reaction is required, e.g., a catalyzing amount. In certain embodiments, the acidic material and/or acid generating material can be used in an amount from 0.01 to 5 percent by weight, based on the total weight of the composition.

In certain embodiments, the hard coat is deposited from a coating composition that also comprises the polymer-enclosed color-imparting particles described herein. In certain embodiments, the polymer-enclosed color-imparting particles are present in the hard coat composition in an amount of 1 to 25 weight percent, such as 5 to 15 weight percent, with weight percent being based on the total solid weight of the composition. In certain embodiments, the alkoxide is comprises 50 to 99 weight percent based on total solid weight.

The hard coat composition may also include other materials. For example, such compositions can also include one or more standard additives, such as flow additives, rheology modifiers, adhesion promoters, UV absorbers, and the like.

In certain embodiments, the hard coat composition comprises an organosiloxane polyol, as described in U.S. patent application Ser. No. 11/116,552 at [0004] to [0007], the cited portion of which being incorporated herein by reference. Such a material, if used, is often present in the coating composition in an amount of 1 to 25 weight percent, such as 2 to 15 or 5 to 10 weight percent, based on the total solid weight of the coating composition.

In certain embodiments, the hard coat composition comprises a silica sol comprising silica nanoparticles and a polymerizable (meth)acrylate binding agent. As used herein, the term "silica sol" refers to a colloidal dispersion of finely divided silica particles dispersed in a binding agent, which comprises an polymerizable (meth)acrylate. As used herein, the term "silica" refers to $SiO_2$. In certain embodiments, the nanoparticles present in the silica sol have an average primary particle size of 300 nanometers or less, such as 200 nanometers or less, or, in some cases, 100 nanometers or less, or, in yet other cases, 50 nanometers or less, or, in some cases, 20 nanometers or less.

As indicated, the silica sol comprises a polymerizable (meth)acrylate binding agent. As used herein, the term "(meth)acrylate" is meant to include both acrylate and methacrylate. Polymerizable (meth)acrylates suitable for use as a binding agent include unsaturated (meth)acrylate monomers and oligomers, such as, for example, mono-, di-, tri-, tetra-, and penta-(meth)acrylates. Non-limiting specific examples of such materials include hydroxyethylmethacrylate, trimethylolpropaneformalacrylate, hexanedioldiacrylate, tripropyleneglycoldiacrylate, neopentylglycoldiacrylate, trimethylolpropanetriacrylate, glycerintriacrylate, and/or pentaerythritoltetraacrylate, among others.

Silica sols suitable for use in the present invention are commercially available. Examples include the Nanocryl® line of products available from Hanse Chemie AG, Geesthacht, Germany. These products are low viscosity sols having a silica content of up to 50 percent by weight.

In certain embodiments, the silica sol further comprises an organic solvent. Suitable organic solvents are those that will stabilize the silica sol in the coating composition. The minimum amount of solvent present in the coating composition is a solvating amount, i.e., an amount which is sufficient to solubilize or disperse the silica sol in the coating composition. For example, the amount of solvent present may range from 20 to 90 weight percent based on the total weight of the coating composition. Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butylpyrrolidinone, N-ethylpyrrolidinone, N-(N-octyl)-pyrrolidinone, N-(n-dodecyl)pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold as CELLOSOLVE industrial solvents by Union Carbide, propylene glycol methyl ether and propylene glycol methyl ether acetate, which are sold as DOWANOL® PM and PMA solvents, respectively, by Dow Chemical and mixtures of such recited solvents.

As a result, in certain embodiments, such as where the silica sol is one of the commercially available Nanocryl® silica sols described above, the silica sol is first diluted with an organic solvent prior to combining the silica sol with an at least partially hydrolyzed alkoxide of the type described herein.

In certain embodiments, the silica sol is present in the hard coat composition in an amount of 1 to 25 percent by weight, such as 2 to 15 percent by weight, with the weight percents being based on the total weight of the composition.

In certain embodiments, such hard coat compositions are, aside from the materials introduced to the coating composition as part of the silica sol, substantially free of, or, in some cases, completely free of any free radically polymerizable material. Examples of such materials are mono-, di-, tri-, tetra- or pentafunctional monomeric or oligomeric aliphatic, cycloaliphatic or aromatic (meth)acrylates. As used herein, the term "substantially free" means that the material being discussed is present in the composition, if at all, as an incidental impurity. In other words, the material does not affect the properties of the composition. As used herein, the term "completely free" means that the material is not present in the composition at all.

In certain embodiments, such hard coat compositions are substantially free of, or, in some cases, completely free of any free radical polymerization initiators. Such materials include any compound that forms free radicals upon exposure to actinic radiation. Specific examples of such materials, which, in certain embodiments, are substantially or completely absent from the coating compositions of the present invention, are benzoins, benzil, benzil ketals, anthraquinones, thioxanthones, xanthones, acridine derivatives, phenazene derivatives, quinoxaline derivatives, 1-phenyl-1,2-propanedione-2-O-benzoyloxime, 1-aminophenyl ketones, 1-hydroxyphenyl ketones, and triazine compounds. Other free radical polymerization initiators, which, in certain embodiments, are substantially or completely absent from the hard coat compositions described herein are acetophenones, benzil ketals and benzoylphosphine oxides. Another class of free radical polymerization initiators, which, in certain embodiments, are substantially or completely absent from such hard coat compositions are the ionic dye-counter ion compounds, which are capable of absorbing actinic rays and producing free radicals, such as the materials described in published European-patent application EP 223587 and U.S. Pat. Nos. 4,751,102; 4,772,530 and 4,772,541.

The hard coat composition may be applied to the transparent tinted coating using, for example, any conventional coating technique including flow coating, dip coating, spin coating, roll coating, curtain coating and spray coating. Application of the coating composition may, if desired, be done in an environment that is substantially free of dust or contaminants, e.g., a clean room. Hard coats may range in thickness from 0.1 to 50 microns (µm), such as from 2 to 20 µm, and, in some cases, from 2 to 10 µm, e.g., 5 µm.

Following application of a hard coat composition to the transparent tinted coating, the hard coat composition is cured, such as by flashing the coating at ambient temperature for up to one hour, and then baking the coating at an appropriate temperature and time, which can be determined by one skilled in the art based upon the particular coating and/or article being used.

In certain embodiments, when a material that generates an acid on exposure to actinic radiation is present in the hard coat composition, as described above, the composition may be at least partially cured by irradiating the composition with a curing amount of ultraviolet light, either after thermally curing the coating, simultaneously during a thermal curing process, or in lieu of a thermal curing process. During the irradiation step, the coated article may be maintained at room temperature, e.g., 22° C., or it may be heated to an elevated temperature which is below the temperature at which damage to the article occurs.

In certain embodiments, when a silica sol comprising a polymerizable (meth)acrylate binding agent is used in the hard coat composition, as described above, the polymerizable (meth)acrylate present in the silica sol remains substantially uncrosslinked after the coating composition has been cured, i.e., after the previously described curing step which cures the hardcoat resin matrix. As used herein, the term "substantially uncrosslinked" means that upon cure of the coating composition to form a hard coat, the polymerizable (meth)acrylate has not reacted with itself or other composition components to an extent that the adhesion of the resultant hard coat on a transparent tinted coating is negatively impacted, i.e., the hard coat exhibits a reduced adhesion rating, when measured as described in the Examples herein.

As previously indicated, the present invention is also directed to colored composite transparencies exhibiting a plurality of hues, wherein the composite transparency comprises a surface at least partially coated with a transparent tinted coating deposited from a coating composition comprising polymer-enclosed color-imparting particles, wherein the coating has a plurality of thicknesses. As used herein, the term "hue" refers to the quality of a color as determined by its dominant wavelength. As used herein, the term "plurality" means two or more.

As indicated, in these embodiments of the present invention, the transparent coating has a plurality of thicknesses. This can be achieved by any of a variety of methods. For example, in certain embodiments, this is achieved by applying the coating to a transparent article comprising a surface that has been roughened or textured, so that the thickness of the coating varies along the roughened or textured surface. Alternatively, this can be achieved during the coating deposition step, by differentially depositing the coating over selected portions of the surface of the article. This can also be achieved by depositing the coating onto the article and then removing a portion of the coating at certain locations, such as in any desired pattern form. As a result, articles with a patterned appearance may be produced, if desired.

The present invention is also directed to a composite transparency comprising a first surface at least partially coated with a transparent tinted coating having a first hue and deposited from a coating composition comprising polymer-enclosed color-imparting particles, and a second surface opposing the first surface, wherein the second surface is at least partially coated with a transparent tinted coating having a second hue and deposited from a coating composition comprising polymer-enclosed color-imparting particles. In certain embodiments, the first hue is different from the second hue. As will be appreciated, a composite transparency can be produced which exhibits a desired hue by coating two opposing surfaces of the transparency with transparent coating of different hues. For example, and without limitation, the first surface may be coated with a transparent cyan colored coating and the second surface may be colored with a transparent yellow colored coating. The resultant composite transparency would then exhibit a green or blue-green color, depending on the relative thicknesses of each transparent coating.

As a result, the present invention is also directed to a method for providing a composite transparency exhibiting a desired color. These methods comprise (i) depositing a first transparent tinted coating on at least a portion of a first surface of the transparency, and (ii) providing a second transparent tinted coating on at least a portion of a second surface of the transparency, wherein the second surface opposes the first surface. In these methods of the present invention, at least one of the first coating composition and the second coating composition comprises polymer-enclosed color imparting particles.

Illustrating the invention are the following examples that are not to be considered as limiting the invention to their details. All parts and percentages in the examples, as well as throughout the specification, are by weight unless otherwise indicated.

EXAMPLES

Example 1

Preparation of Polyurethane Dispersion

This example describes the preparation of a polyurethane dispersion that was subsequently used to the form the respective polyurethane/nanopigment dispersions of Examples 2 to 5. The polyurethane dispersion was prepared from the following mixture of ingredients in the amounts indicated:

| Ingredients | Weight (grams) |
| --- | --- |
| Charge I | |
| Poly (butylene oxide)[1] | 355.6 |
| Dimethylolpropionic acid (DMPA) | 119.2 |
| Tri-ethylamine | 54.0 |

-continued

| Ingredients | Weight (grams) |
|---|---|
| Butylated hydroxytoluene | 2.2 |
| Triphenyl phosphite | 1.1 |
| Charge II | |
| Hydroxyethyl methacrylate (HEMA) | 27.8 |
| Butyl methacrylate | 48.4 |
| Butyl acrylate | 319.2 |
| Charge III | |
| Methylene bis(4-cyclohexylisocyanate) | 558.9 |
| Charge IV | |
| Butyl methacrylate | 55.6 |
| Charge V | |
| Deionized water | 2086.3 |
| Diethanolamine | 20.2 |
| Ethylenediamine | 26.9 |
| Dimethylethanolamine | 19.7 |
| Charge VI | |
| Butyl methacrylate | 50.0 |

[1]Poly (butylene oxide) having a number average molecular weight of 1000.

The polyurethane dispersion was prepared in a fourneck round bottom flask equipped with an electronic temperature probe, mechanical stirrer, condenser, and a heating mantle. Charge I was stirred 5 minutes in the flask at a temperature of 125° C. Charge II was added and the mixture was cooled to 70° C. Charge III was added over a 10 minute period. Charge IV was added and the resulting mixture was gradually heated to 90° C. over 90 minutes and then held at 90° C. for 1 hour. Charge V was stirred in a separate flask and heated to 60° C. 1387.8g of the reaction product of Charges I, II, III, and IV was added to Charge V over 10 minutes. Charge VI was added and the resulting mixture was cooled to room temperature. The final product was a translucent emulsion with an acid value of 12.5, a Brookfield viscosity of 3710 centipoise (spindle #5 at 60 rpm), a pH of 7.6, and a nonvolatile content of 29.4% as measured at 110° C. for one hour.

Example 2

Polyurethane/Nanopigment Dispersion with PB 15:3

This example describes the preparation of a nano-sized PB 15:3 phthalocyanine blue pigment dispersion that was subsequently used to form coatings. The dispersion was prepared from the following mixture of ingredients in the amounts indicated:

| Ingredients | Weight (grams) |
|---|---|
| Charge I | |
| Polyurethane dispersion of Example 1 | 7271.0 |
| Deionized water | 3293.1 |
| Hydroquinone methyl ether (MEHQ) | 2.0 |
| PB 15:3 pigment | 1079.5 |
| Shellsol OMS (Shell Chemical Co.) | 131.5 |
| Charge II | |
| Deionized water | 102.4 |
| t-Butyl hydroperoxide (70% aqueous solution) | 12.3 |
| Charge III | |
| Deionized water | 512.1 |

-continued

| Ingredients | Weight (grams) |
|---|---|
| Ferrous ammonium sulfate | 0.15 |
| Sodium metabisulfite | 12.3 |

The ingredients were mixed using a Ross rotor/stator mixer Model #HSM-100L for 2.5 hours and then recycled through an Advantis V15 Drais mill containing 500 ml of 0.3 mm YTZ grinding media in a one liter grinding chamber. The mixture was milled at 1400 rpm for a total time of 19.0 hours. The progress of the milling was monitored by visually observing changes in the transparency of thin films of samples drawn down over black and white Leneta paper. Charge II was added and the resulting mixture was stirred 5 minutes at 11° C. Charge III was added in two aliquots over 5 minutes. The temperature of the mixture increased to 13° C. The final product was a blue liquid with a Brookfield viscosity of 26 centipoise (spindle #1 at 60 rpm), a pH of 7.2, and a nonvolatile content of 30.0% as measured at 110° C. for one hour.

Example 3

Polyurethane/Nanopigment Dispersion with PR 122

This example describes the preparation of a nano-sized PR 122 quinacridone magenta pigment dispersion that was subsequently used to form coatings. The dispersion was prepared from the following mixture of ingredients in the amounts indicated:

| Ingredients | Weight (grams) |
|---|---|
| Charge I | |
| Polyurethane dispersion of Example 1 | 7271.0 |
| Deionized water | 3293.1 |
| Hydroquinone methyl ether (MEHQ) | 2.0 |
| PR 122 pigment | 1079.5 |
| Shellsol OMS (Shell Chemical Co.) | 131.5 |
| Charge II | |
| Deionized water | 102.4 |
| t-Butyl hydroperoxide (70% aqueous solution) | 12.3 |
| Charge III | |
| Deionized water | 512.1 |
| Ferrous ammonium sulfate | 0.15 |
| Sodium metabisulfite | 12.3 |

The ingredients were mixed using a Ross rotor/stator mixer Model #HSM-100L for 4 hours and then recycled through an Advantis V15 Drais mill containing 500 ml of 0.3 mm YTZ grinding media in a one liter grinding chamber. The mixture was milled at 1400 rpm for a total time of 23 hours. The progress of the milling was monitored by visually observing changes in the transparency of thin films of samples drawn down over black and white Leneta paper. Charge II was added and the resulting mixture was stirred 5 minutes at 24° C. Charge III was added in two aliquots over 5 minutes. The temperature of the mixture increased to 26° C. The final product was a magenta liquid with a Brookfield viscosity of 27 centipoise (spindle #1 at 60 rpm), a pH of 7.4, and a nonvolatile content of 29.3% as measured at 110° C. for one hour.

Example 4

Polyurethane/Nanopigment Dispersion with PY 128

This example describes the preparation of a nano-sized PY 128 di-azo yellow pigment dispersion that was subsequently used to form coatings. The dispersion was prepared from the following mixture of ingredients in the amounts indicated:

| Ingredients | Weight (grams) |
| --- | --- |
| Charge I | |
| Polyurethane dispersion of Example 1 | 7271.0 |
| Deionized water | 3293.1 |
| Hydroquinone methyl ether (MEHQ) | 2.0 |
| PY 128 pigment | 1079.5 |
| Shellsol OMS (Shell Chemical Co.) | 131.5 |
| Charge II | |
| Deionized water | 102.4 |
| t-Butyl hydroperoxide (70% aqueous solution) | 12.3 |
| Charge III | |
| Deionized water | 512.1 |
| Ferrous ammonium sulfate | 0.15 |
| Sodium metabisulfite | 12.3 |

The ingredients were mixed using a Ross rotor/stator mixer Model #HSM-100L for 5.5 hours and then recycled through an Advantis V15 Drais mill containing 500 ml of 0.3 mm YTZ grinding media in a one liter grinding chamber. The mixture was milled at 1400 rpm for a total time of 23 hours. The progress of the milling was monitored by visually observing changes in the transparency of thin films of samples drawn down over black and white Leneta paper. Charge II was added and the resulting mixture was stirred 5 minutes. Charge III was added in two aliquots over 5 minutes. The final product was a yellow liquid with a Brookfield viscosity of 53 centipoise (spindle #1 at 60 rpm), a pH of 7.3, and a nonvolatile content of 28.8% as measured at 110° C. for one hour.

Example 5

Polyurethane/Nanopigment Dispersion of Carbon Black

This example describes the preparation of a nano-sized carbon black dispersion that was subsequently used to form coatings. The dispersion was prepared from the following mixture of ingredients in the amounts indicated:

| Ingredients | Weight (grams) |
| --- | --- |
| Polyurethane dispersion of Example 1 | 6078.1 |
| Deionized water | 4535.9 |
| Monarch 1300 (Cabot Corporation) | 1814.4 |
| Shellsol OMS (Shell Chemical Co.) | 217.7 |

The ingredients were recycled through an Advantis V15 Drais mill containing 500 ml of 0.3 mm YTZ grinding media in a one liter grinding chamber. The mixture was milled at 1400 rpm for a total time of 46 hours. The product was a black liquid with a nonvolatile content of 29.5% as measured at 110° C. for one hour. A portion of this carbon black dispersion was used as an intermediate to make the final dispersion that was prepared from the following mixture of ingredients in the amounts indicated:

| Ingredients | Weight (grams) |
| --- | --- |
| Charge I | |
| Polyurethane dispersion of Example 1 | 443.2 |
| Deionized water | 110.0 |
| Propylene glycol monobutyl ether | 75.0 |
| Carbon black dispersion from above | 310.0 |
| Charge II | |
| Deionized water | 30.0 |
| Charge III | |
| Deionized water | 10.0 |
| t-Butyl hydroperoxide (70% aqueous solution) | 1.0 |
| Charge IV | |
| Deionized water | 50.0 |
| Ferrous ammonium sulfate | 0.01 |
| Sodium metabisulfite | 1.0 |

Charge I was mixed in a beaker and then recycled through a Microfluidizer® M110T at 8000 psi for 10 minutes and transferred to a fourneck round bottom flask equipped with an overhead stirrer, condenser, thermometer, and a nitrogen atmosphere. Charge II was used to rinse the Microfluidizer® and then added to the flask. The temperature of the mixture was adjusted to 28° C. The polymerization was initiated by adding charge III followed by a 30 minute addition of charge IV. The temperature of the mixture increased to 33° C. The final pH of the dispersion was 7.1, the nonvolatile content was 26.3%, and the Brookfield viscosity was 23 cps (spindle #1, 60 rpm).

Examples 6 to 13

Coating Compositions and Coated Lenses

These examples describe preparation of coating compositions for tinted polycarbonate lenses. The coatings were prepared from the following mixture of ingredients in the gram amounts indicated:

| Ingredients | Example 6 (Cyan) | Example 7 (Magenta) | Example 8 (Yellow) | Example 9 (Black) | Example 10 (Brown) |
|---|---|---|---|---|---|
| Ethylene glycol monobutyl ether | 30.0 | 30.0 | 30.0 | 9.0 | 1.4 |
| Texanol (trimethylpentanediol mono-isobutyrate, Eastman Kodak | 15.0 | 15.0 | 15.0 | | |
| Cymel 327 (methylated melamine/formaldehyde, Cytec Industries, Inc.) | 38.9 | 38.9 | 38.9 | 11.7 | 7.8 |
| Deionized water | 90.0 | 90.0 | 75.0 | 27.0 | 6.3 |
| Dispersion of Example 2 | 228.1 | | | 4.2 | 1.4 |
| Dispersion of Example 3 | | 233.0 | | | 9.3 |
| Dispersion of Example 4 | | | 232.1 | | 35.8 |
| Dispersion of Example 5 | | | | 69.6 | |

For each coating, the first three ingredients were stirred for 10 minutes in a plastic beaker. The water was added and the resulting mixture was stirred for 10 minutes. The final ingredients were added and the total mixture was stirred for an additional 30 minutes.

Examples 11 to 13 were made by mixing the coatings of Examples 6, 7, and 8 in the gram amounts shown below:

| Ingredients | Example 11 (Blue-green) | Example 12 (Red) | Example 13 (Violet) |
|---|---|---|---|
| Example 6 | 30.0 | | 12.5 |
| Example 7 | | 35.0 | 37.5 |
| Example 8 | 20.0 | 15.0 | |

PDQ® coated Gentex® polycarbonate plano lenses having a diameter of 76 millimeters were washed with dishwashing detergent and water, rinsed with deionized water and dried. The lenses were treated with oxygen plasma at a flow rate of 100 milliliters (mL) per minute of oxygen at 100 watts of power for 5 minutes.

The lenses were coated with the solutions of Examples 6 to 13 via a spin coating process. About 1-2 mL of the solution of each example was dispensed onto the lens and the lens rotated for seven seconds at speeds of 700 to 1100 rpm. Each lens was the spin coated with HiGard®1080 coating solution, a commercially available solgel hardcoat producing coating solution from PPG Industries, Inc.

The coated lenses were cured in a forced air oven via the following cure cycle: 60° C. for 20 minutes, ramp to 120° C. over 5 minutes, hold at 120° C. for 3 hours and cool to room temperature. Coating thicknesses ranged from 2 to 5 microns for the color coat and 3 to 4 microns for the hardcoat. L*, a*, b*, % transmission, and % haze were measured on a Hunter Lab UltraScan XE spectrophotometer and the results are reported below.

| Example | Color | % Transmission | L* | a* | b* | % Haze |
|---|---|---|---|---|---|---|
| 6 | Cyan | 17.6 | 49.1 | −24.5 | −60.7 | 0.7 |
| 7 | Magenta | 59.0 | 81.3 | 27.1 | −16.9 | 0.3 |
| 8 | Yellow | 83.4 | 93.2 | −16.6 | 93.4 | 0.6 |
| 9 | Black | 6.7 | 31.2 | −6.5 | 6.5 | 5.8 |
| 10 | Brown | 24.7 | 56.8 | 16.9 | 54.5 | 5.3 |
| 11 | Blue-green | 13.5 | 43.5 | −47.6 | 2.5 | 5.2 |
| 12 | Red | 12.4 | 41.9 | 71.6 | 55.4 | 6.2 |
| 13 | Violet | 5.2 | 27.3 | 47.7 | −70.5 | 3.4 |

Examples 14 to 16

Coating Compositions and Coated Glass

These examples describe preparations of coating compositions for tinted glass articles. The coatings were prepared from the following mixture of ingredients in the gram amounts indicated:

| Ingredients | Example 14 (Cyan) | Example 15 (Magenta) | Example 16 (Yellow) |
|---|---|---|---|
| BYK 346 (BYK Chemie) | 0.10 | 0.10 | 0.10 |
| Glycidoxypropyl trimethoxy silane (Silquest ® A-187, GE Advanced Materials) | 1.93 | 1.93 | 1.93 |
| Cymel 327 (methylated melamine/formaldehyde, Cytec Industries, Inc.) | 2.00 | 2.00 | 2.00 |
| Deionized water | 24.27 | 22.56 | 21.28 |
| Dispersion of Example 2 | 71.70 | | |
| Dispersion of Example 3 | | 73.41 | |
| Dispersion of Example 4 | | | 74.69 |

For each coating, all ingredients were added to 4 ounce glass jars and shaken by hand until mixed. All three coatings were applied to glass panels using a drawdown bar. The coatings were kept exposed to the air for 20 minutes at ambient temperature and then baked for 45 minutes at 154° C.

The cured coatings were evaluated for adhesion to the glass panels under "wet" conditions. Two tests were performed: (1) Immersion: Panels were held on their sides by a rack and submerged in a pan of water at ambient temperature (approximately 21° C.) for 24 hours. The panels were then removed from the water, blotted dry, and immediately tested by cross-hatch adhesion. A single blade scribe and template available from Elcometer was used to inscribe lines 3mm apart to form a grid of 25 squares. 3M™ 232 masking tape was then applied over the grid and pulled off. The percent of the area of the grid that pulled off was recorded as % Adhesion Loss. (2) Hot Rinse: Panels were held upright in a rack and placed under a constant stream of hot tap water (approximately 105° F.) for 15 minutes over the surface of the coatings. After drying, the panels were then immediately crosshatched and rated as described in the previous test. Test results are provided in the following table:

|  | Example 14 (Cyan) | Example 15 (Magenta) | Example 16 (Yellow) |
| --- | --- | --- | --- |
| Immersion Test - % Adhesion Loss | 0 | 0 | 0 |
| Hot Rinse Test - % Adhesion Loss | 0 | 0 | 0 |

Example 17

Transparent Coaster

A transparent yellow glass coaster decorated with a stylized orange and red sun was made using the magenta and yellow coatings of Examples 15 and 16. The coaster was made from a 102 mm×127 mm×5 mm (4 inch×5 inch×3/16 inch) piece of Starphire™ glass (PPG Industries) on which was etched an image of the sun consisting of four segments, three concentric circles surrounded by a segment consisting of eight rays. The segments were etched into the glass to a depth of about 1 mm. Using an artist's paintbrush, a layer of the magenta coating of example 15 was applied to the four etched segments of the glass. The coating was allowed to dry for two hours and a second layer of the magenta coating of example 15 was applied to two of the four etched segments of the glass. The side of the glass opposite the etched image was covered uniformly with the yellow coating of example 16 applied with a drawdown bar. After drying at ambient temperature for one hour the glass coaster was baked for 45 minutes at 154° C. The results are illustrated in FIG. 1. The segments with one layer of the magenta coating of example 15 appeared to be orange in color and the segments with two layers appeared to be red in color.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A colored composite transparency comprising a surface at least partially coated with a transparent colored coating deposited from a coating composition comprising an aqueous dispersion of polymer-enclosed color-imparting particles, wherein the transparency comprises glass.

2. The colored composite transparency of claim 1, wherein the transparency comprises a surface that is textured or roughened.

3. The colored composite transparency of claim 1, wherein the nanoparticles comprise inorganic nanoparticles.

4. The colored composite transparency of claim 1, wherein the nanoparticles comprise organic nanoparticles.

5. A colored composite transparency exhibiting a plurality of hues, wherein the composite transparency comprises a surface at least partially coated with a transparent colored coating deposited from a coating composition comprising an aqueous dispersion of polymer-enclosed color-imparting particles, wherein the coating has a plurality of thicknesses, and wherein the transparency comprises glass.

6. A composite transparency comprising a first surface at least partially coated with a transparent coating having a first hue and deposited from a coating composition comprising a first aqueous dispersion of polymer-enclosed color-imparting particles, and a second surface opposing the first surface, wherein the second surface is at least partially coated with a transparent coating having a second hue and deposited from a coating composition comprising a second aqueous dispersion of polymer-enclosed color-imparting particles, wherein the transparency comprises glass.

7. A composite transparency at least partially coated with a multi-layer coating comprising: (a) a first tinted coating deposited from a coating composition comprising polymer-enclosed color-imparting particles, and (b) a second layer deposited over at least a portion of the first layer and comprising a hard coat deposited from a composition comprising an alkoxide of the general formula $R_xM(OR')_{z-x}$, wherein R is an organic radical, M is selected from the group consisting of silicon, aluminum, titanium, zirconium and mixtures thereof, R' is a low molecular weight alkyl radical, z is the valence of M and x is a number less than z and may be zero.

8. The composite transparency of claim 7, wherein the alkoxide comprises a combination of a glycidoxy[$(C_1$-$C_3)$alkyl]tri$(C_1$-$C_4)$alkoxysilane monomer and a tetra$(C_1$-$C_6)$alkoxysilane monomer.

9. The composite transparency of claim 8, wherein the glycidoxy[$(C_1$-$C_3)$alkyl]tri$(C_1$-$C_4)$alkoxysilane monomer comprises y-glycidoxypropyltrimethoxysilane.

10. The composite transparency of claim 8, wherein the tetra$(C_1$-$C_6)$alkoxysilane monomer comprises tetramethoxysilane and/or tetraethoxysilane.

11. The composite transparency of claim 7 wherein the tinted coating is deposited from a coating composition comprising an aqueous dispersion of polymer-enclosed color-imparting particles, wherein the aqueous dispersion is prepared by a method comprising:

(A) providing a mixture, in an aqueous medium, of (I) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or (B) providing a mixture, in an aqueous medium, of (i) color-imparting particles, (ii) a polymerizable ethylenically unsaturated monomer, and (iii) a water-dispersible polymerizable dispersant; forming the color-imparting particles into nanoparticles; and polymerizing the ethylenically unsaturated monomer and polymerizable dispersant to form polymer-enclosed color-imparting particles comprising a water-dispersible polymer.

12. The composite transparency of claim 7, wherein the hard coat is deposited from a composition comprising polymer-enclosed color-imparting particles.

13. The composite transparency of claim 7, wherein the tinted coating has a plurality of thicknesses.

14. The composite transparency of claim 13, wherein the transparency has a surface that is textured or roughened.

* * * * *